(12) United States Patent
Nayak et al.

(10) Patent No.: US 11,062,281 B2
(45) Date of Patent: Jul. 13, 2021

(54) PROCESSING FINANCIAL TRANSACTIONS

(71) Applicant: Visa International Service Association, San Francisco, CA (US)

(72) Inventors: Koni Uttam Nayak, Mumbai (IN); Ashish Kulpati, Gurgaon (IN); Pankaj Rajurkar, Indore (IN); Glenn Leon Powell, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 275 days.

(21) Appl. No.: 15/509,182

(22) PCT Filed: Oct. 6, 2015

(86) PCT No.: PCT/IB2015/057629
§ 371 (c)(1),
(2) Date: Mar. 6, 2017

(87) PCT Pub. No.: WO2016/055930
PCT Pub. Date: Apr. 14, 2016

(65) Prior Publication Data
US 2017/0270494 A1    Sep. 21, 2017

(30) Foreign Application Priority Data
Oct. 9, 2014   (IN) ............................ 5083/CHE/2014

(51) Int. Cl.
*G06Q 20/10*   (2012.01)
*G06F 16/22*   (2019.01)
(Continued)

(52) U.S. Cl.
CPC ........... *G06Q 20/102* (2013.01); *G06F 16/22* (2019.01); *G06F 16/2379* (2019.01);
(Continued)

(58) Field of Classification Search
CPC .... G06Q 20/102; G06Q 20/223; G06Q 20/32; G06Q 20/3224; G06F 16/22; G06F 16/2379; G06F 16/2455; H04W 4/12
See application file for complete search history.

(56) References Cited

U.S. PATENT DOCUMENTS 8,121,957 B1 * 2/2012 Nowka .................. G06Q 20/12
                                                                705/64
8,458,090 B1   6/2013 Batra et al.
(Continued)

FOREIGN PATENT DOCUMENTS

CN   101030277   9/2007
CN   101379524   3/2009
(Continued)

OTHER PUBLICATIONS

International Search Report / Written Opinion, dated Jan. 29, 2016, in PCT Application No. PCT/IB2015/057629, 10 pages.
(Continued)

*Primary Examiner* — Scott C Anderson
(74) *Attorney, Agent, or Firm* — Kilpatrick Townsend & Stockton LLP

(57) ABSTRACT

Systems and methods for processing a financial transaction are provided. In a method conducted at an issuing server computer associated with a first entity, a transaction request message is transmitted to an acquiring server computer associated with a second entity. The transaction request message is in respect of a push transaction in which funds from the first entity are transferred to the second entity and includes a first set of data elements. In response to transmitting the transaction request message, a transaction response message and a second set of data elements are received. The second set of data elements are associated with the first set of data elements and the financial transac-
(Continued)

tion is processed using information contained in the first set of data elements and the second set of data elements.

19 Claims, 6 Drawing Sheets

(51) Int. Cl.
*G06F 16/23* (2019.01)
*G06F 16/2455* (2019.01)
*G06Q 40/02* (2012.01)
*H04W 4/12* (2009.01)
*G06Q 20/32* (2012.01)
*G06Q 20/22* (2012.01)

(52) U.S. Cl.
CPC ....... *G06F 16/2455* (2019.01); *G06Q 20/223* (2013.01); *G06Q 20/32* (2013.01); *G06Q 20/3224* (2013.01); *G06Q 40/02* (2013.01); *H04W 4/12* (2013.01)

(56) References Cited

U.S. PATENT DOCUMENTS

| | | | |
|---|---|---|---|
| 8,751,379 B1 | 6/2014 | Bueche | |
| 2006/0235795 A1 | 10/2006 | Johnson et al. | |
| 2007/0156444 A1* | 7/2007 | Lal | G06Q 20/40 705/1.1 |
| 2008/0275799 A1* | 11/2008 | Randazza | G06Q 30/04 705/34 |
| 2011/0029416 A1 | 2/2011 | Greemspan | |
| 2011/0055077 A1 | 3/2011 | French et al. | |
| 2011/0099107 A1 | 4/2011 | Saxena et al. | |
| 2011/0258118 A1* | 10/2011 | Ciurea | G06Q 40/00 705/44 |
| 2013/0097078 A1* | 4/2013 | Wong | G06Q 20/027 705/44 |
| 2013/0124413 A1* | 5/2013 | Itwaru | G06Q 20/4012 705/44 |
| 2013/0218769 A1 | 8/2013 | Pourfallah et al. | |
| 2013/0238455 A1* | 9/2013 | Laracey | G06Q 20/108 705/21 |
| 2014/0040139 A1* | 2/2014 | Brudnicki | G06Q 20/227 705/44 |
| 2014/0046844 A1* | 2/2014 | Grigg | G06Q 20/20 705/44 |
| 2014/0052607 A1 | 2/2014 | Park | |
| 2014/0074637 A1* | 3/2014 | Hammad | G06Q 20/325 705/21 |
| 2014/0279420 A1* | 9/2014 | Okerlund | G06Q 40/00 705/39 |
| 2014/0344155 A1* | 11/2014 | Liu | G06Q 20/4016 705/44 |
| 2015/0348003 A1* | 12/2015 | Reader | G06Q 20/3224 705/16 |

FOREIGN PATENT DOCUMENTS

| | | |
|---|---|---|
| CN | 107111813 | 8/2017 |
| EP | 3204910 | 8/2017 |
| GB | 2372615 A | 8/2008 |
| RU | 2467501 C2 | 11/2012 |
| RU | 2706180 | 11/2019 |
| SG | 11201701095 T | 3/2018 |
| WO | 0058921 A1 | 10/2000 |
| WO | 2011066381 A2 | 6/2011 |
| WO | 2012044257 A1 | 4/2012 |
| WO | 2015 042548 A1 | 3/2015 |
| WO | 2016 055931 A1 | 4/2016 |

OTHER PUBLICATIONS

Supplementary European Search Report, dated Feb. 13, 2018, in EU Patent Application No. 15848604.3, 8 pages.
Russian Official Action, dated May 14, 2019, in Russian Patent Application No. 2017115931, 8 pages.
CN201580054717.7, "Office Action", dated Jan. 22, 2020, 19 pages.
AU2015329648, "First Examination Report", dated May 20, 2020, 5 pages.
AU2015329648, "Second Examination Report", dated Nov. 2, 2020, 5 pages.
CN201580054717.7, "Office Action", dated Sep. 17, 2020, 19 pages.
RU2017115931, "Notice of Decision to Grant", dated Sep. 18, 2019, 19 pages.
SG11201701095T, "Notice of Decision to Grant", dated Jan. 29, 2018, 4 pages.
AU2015329648, "Third Examination Report", Apr. 28, 2021, 6 pages.
CN201580054717.7, "Office Action", Mar. 16, 2021, 23 pages.

* cited by examiner ized by the payment processing network using at least

PROCESSING FINANCIAL TRANSACTIONS

CROSS REFERENCE(S) TO RELATED APPLICATIONS

This application is the U.S. National Phase of PCT Application No. PCT/IB2015/057629, filed Oct. 6, 2015, which claims the benefit of Indian provisional patent application number 5083/CHE/2014, filed on Oct. 9, 2014, which are all incorporated by reference in their entirety for all purposes.

FIELD OF THE INVENTION

This invention relates to systems and methods for processing a financial transaction and, in particular to systems and methods for processing financial transactions conducted using mobile devices.

BACKGROUND TO THE INVENTION

In general terms, a push transaction may refer to a financial transaction where a consumer obtains an identifier of a merchant and requests an issuing financial institution of the consumer to push a payment to, i.e. to initiate a transfer of funds in favour of, a merchant account identifiable by the merchant identifier.

This differs to a so called pull transaction where the consumer may provide the merchant with a consumer identifier (typically including a primary account number, a card verification value, expiry date, etc., and being usable in identifying a consumer account). The merchant can then use the consumer identifier to request, via an acquiring financial institution and a payment processing network, that a transfer of funds from the consumer's account be initiated by the consumer's issuing financial institution in favour of the merchant's account.

While push transactions may present various advantages over pull transactions, they presently suffer the disadvantage in that the issuing financial institution, or a payment processing network, does not receive sufficient information about the merchant at which the consumer is transacting. It may for example be possible for a consumer to provide only an identifier of the merchant's account and an amount in respect of the transfer of funds to the consumer's issuing financial institution in order to initiate the push transaction.

This could result in the issuing financial institution, or indeed the payment processing network, being unable to calculate business intelligence, evaluate fraud risk or calculate an interchange in respect of the transfer of funds. For example, some issuing financial institutions may prohibit consumers from transacting in certain jurisdictions. Without knowing more information about the merchant at which the consumer is transacting than a merchant account identifier, issuing financial institutions could be unable to enforce such prohibitions.

Furthermore, determining fraud risk could also be problematic as the issuing financial institution or payment processing network would have less information with which to determine whether the transfer of funds may be considered fraudulent.

Additionally, appropriate mechanisms for the calculation of interchange fees may not be catered for.

There is accordingly a need for a solution which solves these and/or other problems, at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with a first aspect of the invention, there is provided a method for processing a financial transaction conducted at an issuing server computer associated with a first entity, the method comprising: transmitting a transaction request message to an acquiring server computer associated with a second entity, the transaction request message being in respect of a push transaction in which funds from the first entity are transferred to the second entity, wherein the transaction request message includes a first set of data elements including: a first entity identifier, a second entity identifier, and an amount associated with the funds to be transferred; in response to transmitting the transaction request message, receiving a transaction response message and receiving a second set of data elements including at least one of: identifying data, location data and entity-type data relating to the second entity; associating the second set of data elements with the first set of data elements; and, processing the financial transaction using information contained in the first set of data elements and the second set of data elements.

Further features provide for the first entity to operate a mobile communication device and for the method to include: receiving, from the mobile communication device, a payment message relating to the transfer of funds, the payment message including the first entity identifier, the second entity identifier, and the amount associated with the funds to be transferred.

A still further feature provides for the method to include: responsive to transmitting the transaction request message, creating a transaction record in a database and storing at least the first set of data elements in the database in association with the transaction record.

Yet further features provide for the transaction request message to be an 0200 message in the standard ISO 8583 messaging format, and for the transaction response message to be an 0210 message in the standard ISO 8583 messaging format.

Further features provide for the transaction response message and second set of data elements to be received together, and for the second set of data elements to be included in the transaction response message.

Still further features provide for the transaction response message to be received from the acquiring server computer via a payment processing network; and for the transaction request message to be transmitted to the acquiring server computer via the payment processing network.

Yet further features provide for the transaction response message to include a second entity identifier and for associating the second set of data elements with the first set of data elements to include: extracting the second entity identifier from the transaction response message; querying the database using the second entity identifier to identify a transaction record having a first set of data elements associated therewith; and, associating the second set of data elements with the first set of data elements.

A further feature provides for receiving the second set of data elements to include receiving an interchange data file including the second set of data elements from a payment processing network. Alternatively, receiving the second set of data elements may include querying a database maintained by a payment processing network in which the second set of data elements is stored in association with the second entity identifier.

Further features provide for processing the financial transaction using information contained in the first set of data elements and the second set of data elements to include one or more of: calculating interchange in respect of the transfer of funds; calculating business intelligence in respect of the transfer of funds; updating a business intelligence record associated with the first entity, wherein updating the record includes storing the second entity identifier, the second set of data elements and the amount in respect of the transfer of funds in the record in association with the first entity identifier; and, where the location data included in the second set of data elements is a physical location of the second entity, querying the location data included in the second set of data elements against permitted transaction locations; and, if the location data is within a permitted transaction location, allowing the transfer of funds to proceed.

In accordance with a second aspect of the invention, there is provided a method for processing a financial transaction conducted at a payment processing network comprising: receiving a transaction request message from an issuing server computer associated with a first entity, the transaction request message being in respect of a push transaction in which funds from the first entity are transferred to a second entity, wherein the transaction request message includes a first set of data elements including: a first entity identifier, a second entity identifier, and an amount associated with the funds to be transferred; identifying a second set of data elements associated with the transfer of funds, the second set of data elements including at least one of: identifying data, location data and entity-type data relating to the second entity; and, processing the financial transaction using information contained in the first set of data elements and the second set of data elements.

A further feature provides for the method to include: forwarding the transaction request message to an acquiring server computer associated with the second entity; receiving, from the acquiring server computer, a transaction response message; and, forwarding the transaction response message to the issuing server computer.

Still further features provide for the transaction response message to include the second set of data elements and for identifying the second set of data elements to include extracting the second set of data elements from the transaction response message.

Yet further features provide for the payment processing network to maintain a database in which the second set of data elements are stored, and for identifying the second set of data elements to include obtaining the second set of data elements from the database.

Even further features provide for the method to include: storing the transaction request message or a derivative thereof in a database in association with the second entity identifier.

A further feature provides for processing the financial transaction using information contained in the first set of data elements and second set of data elements to include calculating interchange in respect of the transfer of funds.

A yet further feature provides for the method to include: transmitting an interchange data file, including interchange calculated using the first set of data elements and the second set of data elements in respect of the transfer of funds and optionally the second set of data elements, to the issuing server computer.

A still further feature provides for processing the financial transaction using information contained in the first set of data elements and second set of data elements to include calculating business intelligence in respect of the transfer of funds.

Even further features provide for the location data included in the second set of data elements to be a physical location of the second entity and for processing the financial transaction using information contained in the first set of data elements and second set of data elements to include: querying the location data included in the second set of data elements against permitted transaction locations; and, if the location data is within a permitted transaction location, allowing the transfer of funds to proceed.

Further features provide for processing the financial transaction using information contained in the first set of data elements and second set of data elements to include updating a business intelligence record associated with the first entity, and for updating the record to include storing the second entity identifier, the second set of data elements and the amount in respect of the transfer of funds in the record in association with the first entity identifier.

In accordance with a third aspect of the invention, there is provided a system for processing a financial transaction including an issuing server computer associated with a first entity comprising: a transaction request message transmitting component for transmitting a transaction request message to an acquiring server computer associated with a second entity, the transaction request message being in respect of a push transaction in which funds from the first entity are transferred to the second entity, wherein the transaction request message includes a first set of data elements including: a first entity identifier, a second entity identifier, and an amount associated with the funds to be transferred; a receiving component for, in response to transmitting the transaction request message, receiving a transaction response message and for receiving a second set of data elements including at least one of: identifying data, location data and entity-type data relating to the second entity; an associating component for associating the second set of data elements with the first set of data elements; and, a processing component for processing the financial transaction using information contained in the first set of data elements and the second set of data elements.

Further features provide for the first entity to operate a mobile communication device and for the issuing server computer to include: a payment message receiving component for receiving, from the mobile communication device, a payment message relating to the transfer of funds, the payment message including the first entity identifier, the second entity identifier, and the amount associated with the funds to be transferred.

A still further feature provides for the issuing server computer to include: a database accessing component for, responsive to transmitting the transaction request message, creating a transaction record in a database and storing the first set of data elements in the database in association with the transaction record.

Yet further features provide for the transaction request message to be an 0200 message in the standard ISO 8583 messaging format, and for the transaction response message to be an 0210 message in the standard ISO 8583 messaging format.

Further features provide for the transaction response message and second set of data elements to be received together, and for the second set of data elements to be included in the transaction response message.

Still further features provide for the receiving component to receive the transaction response message from a payment processing network; and for the transaction request message transmitting component to transmit the transaction request message to the acquiring server computer via the payment processing network.

Yet further features provide for the transaction response message to include a second entity identifier and for the associating component to include: an extracting component for extracting the second entity identifier from the transaction response message; and, a querying component for querying the database using the second entity identifier to identify a transaction record having a first set of data elements associated therewith.

A further feature provides for the receiving component to include an interchange data file receiving component for receiving an interchange data file including the second set of data elements from a payment processing network. Alternatively, for the receiving component to include a database querying component for querying a database maintained by a payment processing network in which the second set of data elements is stored in association with the second entity identifier.

In accordance with a fourth aspect of the invention, there is provided a system for processing a financial transaction including a payment processing network comprising: a transaction request message receiving component for receiving a transaction request message from an issuing server computer associated with a first entity, the transaction request message being in respect of a push transaction in which funds from the first entity are transferred to a second entity, wherein the transaction request message includes a first set of data elements including: a first entity identifier, a second entity identifier, and an amount associated with the funds to be transferred; an identifying component for identifying a second set of data elements associated with the transfer of funds, the second set of data elements including at least one of: identifying data, location data and entity-type data relating to the second entity; and, a processing component for processing the financial transaction using information contained in the first set of data elements and second set of data elements.

Further features provide for the transaction response message to include the second set of data elements and for the identifying component to extract the second set of data elements included in the transaction response message.

Still further features provide for the payment processing network to maintain a database in which the second set of data elements are associated with the second entity identifier, and for the identifying component to query the database using the second entity identifier and obtain the second set of data elements associated therewith.

Yet further features provide for the payment processing network to include a storing component for storing the transaction request message or a derivative thereof in a database in association with the second entity identifier.

In accordance with a fifth aspect of the invention, there is provided a computer program product for processing a financial transaction, the computer program product comprising a non-transitory computer-readable medium having stored computer-readable program code, the computer-readable program code executable by a processing circuit of a payment processing network to perform the steps of: transmitting a transaction request message to an acquiring server computer associated with a second entity, the transaction request message being in respect of a push transaction in which funds from the first entity are transferred to the second entity, wherein the transaction request message includes a first set of data elements including a first entity identifier, a second entity identifier, and an amount associated with the funds to be transferred; in response to transmitting the transaction request message, receiving a transaction response message and receiving a second set of data elements including at least one of: identifying data, location data and entity-type data relating to the second entity; associating the second set of data elements with the first set of data elements; and, processing the financial transaction using information contained in the first set of data elements and the second set of data elements.

The invention extends to a computer program product for processing a financial transaction, the computer program product comprising a non-transitory computer-readable medium having stored computer-readable program code, the computer-readable program code executable by a processing circuit of a payment processing network to perform the steps of: receiving a transaction request message from an issuing server computer associated with a first entity, the transaction request message being in respect of a push transaction in which funds from the first entity are transferred to a second entity, wherein the transaction request message includes a first set of data elements including a first entity identifier, a second entity identifier, and an amount associated with the funds to be transferred; identifying a second set of data elements associated with the transfer of funds, the second set of data elements including at least one of: identifying data, location data and entity-type data relating to the second entity; and, processing the financial transaction using information contained in the first set of data elements and the second set of data elements.

Further features provide for the computer-readable medium to be a non-transitory computer-readable medium and for the computer-readable program code to be executable by a processing circuit.

Aspects of the invention will now be described, by way of example only, with reference to the accompanying drawings.

DETAILED DESCRIPTION WITH REFERENCE TO THE DRAWINGS

Figure 1:
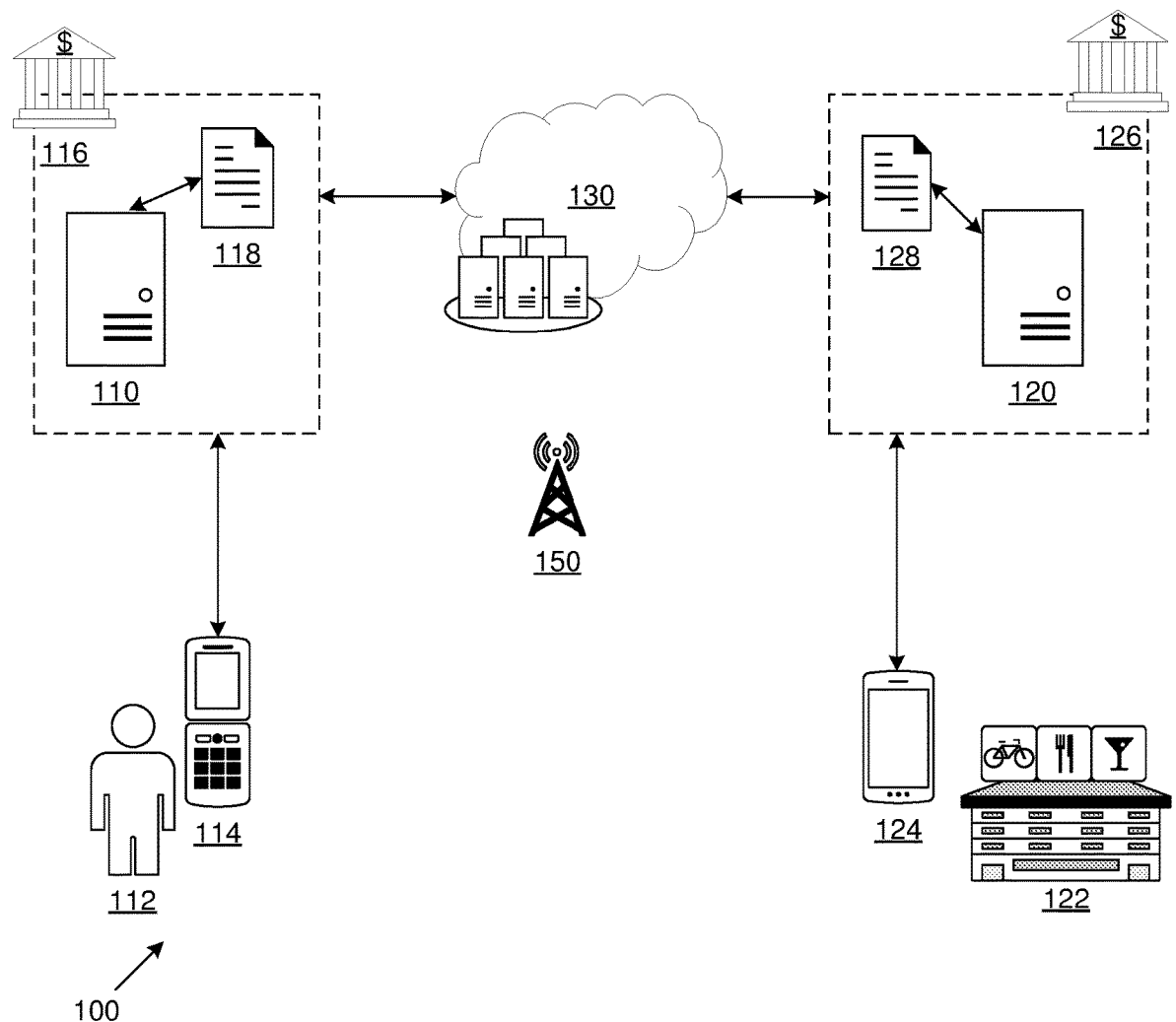
FIG. 1 is a schematic diagram which illustrates an exemplary system for processing a financial transaction.

FIG. 1 is a schematic diagram which illustrates an exemplary system (100) for processing a financial transaction. The system (100) includes a first server computer (110)

associated with a first entity (112) and a second server computer (120) associated with a second entity (122).

The first and second entity (112, 122) may also have a first entity device (114) and second entity device (124) respectively associated therewith. The system (100) may also include a payment processing network (130) via which the first server computer (110) may transmit and receive financial system transaction messages to and from the second server computer (120).

"First" and "second" are generic ways of referring to separate, but possibly related, entities, devices, computers, etc. and should not be interpreted as to limit the exemplary system (100) to only two of such entities, devices, computers and the like. It should be anticipated that the system (100) could be expanded to include third, fourth, fifth entities, devices, computers and so on. Some embodiments anticipate respective "first" and "second" devices and server computers having the same functionality as their respective counterparts.

The payment processing network (130) may include data processing subsystems, networks, server computers and operations used to support and deliver authorization services, exception file services, and clearing and settlement services. The payment processing network (130) may be any suitable network able to transmit and receive financial system transaction messages (e.g., ISO 8583 messages), and process original credit and debit card transactions. An exemplary payment processing system may include VisaNet™. Payment processing systems such as VisaNet™ are able to process credit card transactions, debit card transactions, and other types of commercial transactions.

The first and second server computers (110, 120) respectively may be any appropriate server computers, server computer clusters, distributed server computers, cloud-based server computers and the like. Each of the server computers (110, 120) may include a processor and a non-transitory computer readable medium comprising code executable by the processor to perform functions, such as generating messages, electronically receiving and transmitting messages or data, parsing messages or data, and the like. The server computers (110, 120) may be configured to transmit and receive financial system transaction messages (such as ISO 8583 messages), debit and credit financial accounts, transmit messages to and receive messages from the first and second devices (114, 124) respectively and the like. The first server computer (110) may be maintained or operated by financial institution (116) controlling a financial account (118) of the first entity. Similarly, the second server computer may be maintained or operated by another financial institution (126) controlling a financial account (128) of the second entity (112). Each server computer may have functionality of both first and second servers depending on their role in a transaction.

The first entity (112) may have a first entity identifier associated therewith. The first entity identifier may be derived from or may include portions of a communication address (e.g. an MSISDN) of the first entity device (114), or alternatively an account number identifying the financial account (118) of the first entity. The first entity identifier may include a bank identification number (BIN) which is usable by the payment processing network (130) in identifying a financial institution (e.g. 116) associated with the first entity (112). The first entity identifier may further be used by another entity in order to initiate a transfer of funds in favour of the financial account (118) of the first entity (112).

The first entity device (114) may be any appropriate mobile communication device capable of communicating over a communication network (150). Exemplary mobile communication devices include: a mobile phone such as a feature phone or a smart phone; a tablet computer; a wearable computing device such as a smart watch or smart glasses; a personal digital assistant; a laptop computer and the like. The first entity device (114) may have a mobile application resident therein and installed thereon which may enable the first entity device (114) to transmit data messages to and receive data messages from the first server computer (110). In other embodiments, the first entity device (114) may exchange data messages with the first server computer (110) using Unstructured Supplementary Service Data (USSD) sessions or Short Messaging Service (SMS) messages via the communication network (150).

The second entity similarly has a second entity identifier associated therewith. The second entity identifier may be a primary account number (PAN) of the second entity. In some embodiments, the second entity identifier may be derived from or may include portions of a communication address (e.g. an MSISDN) of the second entity device (124). In other embodiments, the second entity identifier includes an account number identifier the financial account (128) associated with the second entity (122). The second entity identifier may include a bank identification number (BIN) which is usable by the payment processing network (130) in identifying an appropriate financial institution (e.g. 126) to which the transaction request message is to be transmitted.

The second entity device (124) may be an appropriate mobile communication device capable of communicating over the communication network (150) such as a mobile phone being either a feature phone or a smart phone; a tablet computer; a wearable computing device such as a smart watch or smart glasses; a personal digital assistant; a laptop computer and so on. The second entity device (124) may also have an appropriate mobile software application resident therein and installed thereon which may enable the second entity device (124) to transmit data messages to and receive data messages from the second server computer (120). In other embodiments, the second entity device (124) may exchange data messages with the second server computer (120) using USSD sessions or SMS messages. In some embodiments, the second entity device (124) may be a merchant operated mobile communication device, a point-of-sales device, an e-commerce portal or the like.

By enabling the first entity device (114) to exchange messages with the first server computer (110), the first entity (112) may be able to use the first entity device (114) to transact against a financial account (118) of the first entity controlled by the first server computer (110). For example, the first entity may be able to use the first entity device (114) to initiate transactions in favour of the second entity's financial account (128), submit balance enquiries, request single-use or one-time-only payment credentials and the like.

In some embodiments, in response to receiving a request to initiate a transfer of funds in favour of the second entity's financial account (128), the first server computer (110) transmits a transaction request message, including the second entity identifier, to the payment processing network (130) and debits the first entity account (118) with an amount associated with the transfer of funds.

A transaction request message may be any suitable message transmitted from the first server computer (110) to the second server computer (120) through the payment processing network (130). A transaction request message may be in the standard ISO 8583 messaging format, or in any other suitable financial system transaction messaging format. Suitable messages may be in an 0200 message format. In some embodiments, a transaction request message may include a transaction type indicator, a transaction identifier, an amount associated with the transfer of funds from the first entity to the second entity, information identifying the first entity such as the first entity identifier, and the second entity identifier associated with the second entity (122).

In some embodiments, the transaction request message can be an Original Credit Transaction (OCT) type message. An OCT is typically a clearing and settlement credit transaction designed for use in business applications such as a business money transfer or business-to-consumer repayments. OCTs can further be utilised in push transactions between a first entity and a second entity in which the first entity initiates and controls a transfer of funds in favour of a second entity. In some cases, the OCT carries only an identifier (e.g. account number) of the recipient and no information about the sender. A special indicator identifies an OCT to the recipient of the message. OCT messages may also include an Electronic Commerce Indicator (ECI) to indicate an Internet OCTs (if appropriate).

The transaction request message may be routed from the payment processing network (130) to the second server computer (120). The second server computer (120) credits the second entity's financial account (128) with an amount associated with the transfer of the funds and transmits a transaction response message, either confirming or denying the transaction, to the first server computer (110) via the payment processing network (130).

The transaction response message may be any suitable message transmitted from the second server computer (120) to the first server computer (110) through the payment processing network (130), in response to the transaction request message. A transaction response message may be in the standard ISO 8583 messaging format, or in any other suitable financial system transaction messaging format. The transaction response message may be an 0210 message and may include an indication that the transfer of funds was approved or not approved. The transaction response message may include a transaction identifier, information identifying the first entity such as the first entity identifier, and the second entity identifier.

In order to complete the transaction, an interchange, settlement and clearing will need to be performed. This may be done at the end of the day or at any other suitable time period in order to transfer the appropriate funds from the first entity's account (118) to the second entity's account (128).

A clearing process can be a process of exchanging financial details between an acquirer and an issuer to facilitate posting to a consumer's account and reconciliation of the consumer's settlement position. A settlement process can be a process of transferring funds between an acquirer and issuer. In some embodiments, clearing and settlement can occur simultaneously.

In some embodiments, clearing data files are created during the clearing process, and settlement data files are created during the settlement process. These clearing and settlement data files may contain interchange data. Interchange data may include data describing interchange fees, switch fees, interchange revenue, interchange expense, net interchange, or any other information relating to interchange fees or transaction routing details. The clearing and/or settlement files containing interchange data may be transmitted to the first server computer (110) as an interchange data file by the payment processing network (130) or other entity. Alternatively, interchange data may be transmitted to the first server computer (110) by the payment processing network (130) separate from the settlement and clearing processes. For example, the payment processing network (130) may transmit an interchange data file to the first server computer (110) on a periodic basis (e.g., daily). In an alternate embodiment, the clearing and/or settlement files and/or interchange data may be generated at the first server computer (110).

However, in order to calculate interchange, and thus perform settlement and clearing, certain information about the second entity (112) will be required at either the payment processor (130) or the first server computer (130). This is also the case if a fraud risk or other business intelligence is required to be calculated.

In one embodiment of the described systems and methods, information about the second entity (122) and optionally information about the financial institution of the second entity (126) may be transmitted from the second server computer (120) to the payment processing network (130) and/or the first server computer (110) in the transaction response message. This will enable the payment processing network (130) or the first server computer (110), as the case may be, to use information about the second entity (122) as well as information about the first entity (112) to calculate interchange and/or perform fraud risk and business intelligence processing.

In an alternate embodiment, the payment processing network may maintain a database in which information about the second entity, and optionally information about the first entity, may be stored. In such an embodiment, the payment processing network may transmit information about the second entity to the first server computer such that the first server computer may calculate interchange. Alternatively, the payment processing network may use the information about the second entity and information about the first entity to calculate interchange thereat. An interchange data file may be transmitted from the payment processing network to the first server computer periodically. In another alternative, the first server computer may retrieve the second set of data elements from the database such that the first server computer may calculate interchange.

In what follows, the first entity may be a consumer operating a first entity device being a mobile communication device such as a mobile phone. The first server computer may be, or may be a part of a payment processor, maintained or operated by an issuing financial institution controlling the financial account of the consumer and will accordingly be termed "an issuing server computer" from here on.

The second entity may be a merchant operating a second entity device being, for example, a point-of-sales (POS) device. The second server computer may be, or may be a part of a payment processor, maintained or operated by an acquiring financial institution controlling the financial account of the merchant. In some embodiments, the POS device is a mobile communication device of the merchant. Accordingly, the acquiring financial institution may provide infrastructure enabling the merchant to conduct financial transactions against the merchant's financial account using the merchant's mobile communication device. The second server computer will be termed "an acquiring server computer" from here on as that it facilitates the acquiring of funds from the issuing server computer on behalf of the second entity.

It should, however, be appreciated that the terms "issuing server computer" and "acquiring server computer" need not limit application of the systems and methods described herein to a consumer-to-merchant scenario. It is anticipated that consumer-to-consumer (or person-to-person) push payments may be enabled between the first entity and second entity via the issuing server computer and acquiring server computer respectively.

Furthermore, it should be anticipated that in an exemplary reverse interchange scenario, the first entity may be an automatic teller machine (ATM), a mobile money agent facilitating a cash out, or the like while the second entity may be a consumer. It is also anticipated that the first entity may be a consumer and the second entity may be another consumer (i.e. a recipient of a person-to-person payment), an e-commerce merchant, a remote biller (for example a service provider or utility provider) and the like.

Information about the second entity (122) may include identifying data, location data and entity-type data relating to the second entity. For example, information about the second entity (122) being a merchant may include: a merchant category code (MCC) of the second entity and/or other information relating to the type of merchant or individual the second entity is, the name of the second entity (e.g. Easy Traders Inc.), the name of the city in which the second entity is based, a country code of the country in which the second entity is based, and the like. Some embodiments anticipate more detailed location data being utilised, for example a physical address, global positioning system (GPS) coordinates or the like.

Figure 2:
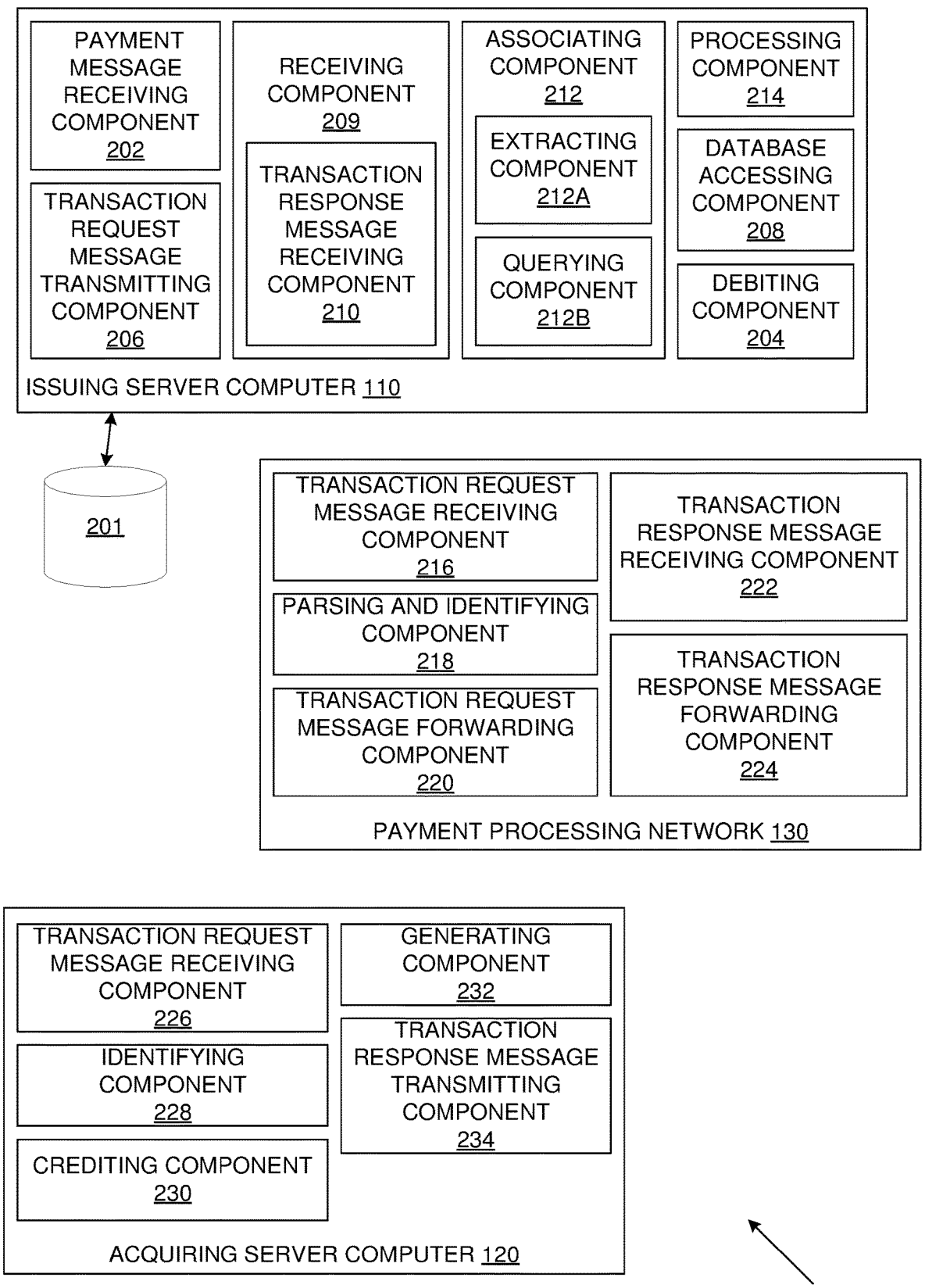
FIG. 2 is a block diagram which illustrates components of an exemplary system for processing a financial transaction.

FIG. 2 is a block diagram which illustrates components of an exemplary system (200), such as that of FIG. 1. The system (200) includes an issuing server computer (110), an acquiring server computer (120) and a payment processing network (130).

The issuing server computer (110) may include a payment message receiving component (202) for receiving, from a first entity device, a payment message relating to a push transfer of funds from the first entity to a second entity. The payment message may include a first entity identifier, a second entity identifier, and an amount associated with the funds to be transferred.

A debiting component (204) may be provided with the issuing server computer (110) for debiting a financial account associated with the first entity in response to receiving the payment message. In some embodiments, the debiting component (204) may temporarily debit the financial account pending a fraud risk calculation.

The issuing server computer (110) may also include a transaction request message transmitting component (206) which generates and transmits a transaction request message to the payment processing network (130).

The transaction request message may include a first set of data elements including: a transaction type indicator indicating, for example, that the transaction is a face-to-face payment transaction for the purchases of goods and services from a merchant; an amount associated with the transfer of funds (e.g., $250); the first entity identifier; and the second entity identifier. The transaction request message may be properly formatted and transmitted as a secure financial system transaction message. In some embodiments, the transaction may be forwarded as SMS OC or Base 1 OC. The transaction request message may be formatted as an ISO 8583 (e.g. 0200) type financial transaction message.

Some embodiments provide for the issuing server computer (110) to include a database accessing component (208) for accessing a database (201), creating a transaction record in the database (201) and storing the transaction request message, or some derivative or record of it (which at least includes the first set of data elements), in association with the transaction record.

The issuing server computer (110) may include a receiving component (209). In this embodiment, the receiving component (209) includes a transaction response message receiving component (210) for receiving a transaction response message, including the second entity identifier and a second set of data elements, from the payment processing network (130). The second set of data elements may include one or more of the group of: identifying data, location data and entity-type data relating to the second entity; transaction data and the like. In other embodiments, the receiving component includes a database querying component for querying a database maintained by a payment processing network in which the second set of data elements is stored in association with the second entity identifier.

The issuing server computer (110) may include an associating component (212) for associating the second set of data elements received in the transaction response message with the first set of data elements stored in the database (201). The associating component (212) may, for example, include an extracting component (212A) for extracting the second entity identifier included in the transaction response message and a querying component (212B) for querying the database (201) using the extracted second entity identifier so as to identify the transaction record and in turn the first set of data elements stored in association therewith. It should be appreciated that the first set of data elements may be extracted from the database in any of a number of alternative ways.

The issuing server computer (110) may further include a processing component (214) for processing the financial transaction using information contained in the first set of data elements and the second set of data elements. Processing the financial transaction may include calculating interchange in respect of the transfer of funds from the first entity to the second entity. For example, interchange fees may vary depending on the first entity, the type of transaction, the type of merchant accepting the transaction and/or other criteria.

Further, processing the financial transaction may also include calculating business intelligence in respect of the transfer of funds; evaluating fraud risk; updating a first entity profile; computing analytics or the like. For example, the issuing server computer (110) may maintain a loyalty database to enable the financial institution associated with the issuing server computer to extend loyalty coupons, discounts, rewards and the like to the first entity based on their spending habits (e.g. at which merchants they transact, etc.). It may also be useful for the issuing server computer (110) to know with which entities the first entity transacts, e.g. for marketing, offers and other analytical purposes.

In some embodiments, location data included in the second set of data elements may be a physical location of the second entity. The processing component (214) may be operable to query the location data included in the second set of data elements against permitted transaction locations associated with the first entity and, if the location data is within a permitted transaction location, allowing the transfer of funds to proceed.

Information contained in the second set of data elements, such as the type of merchant and location of the merchant at which the first entity is transacting may be relevant in calculating a fraud risk or fraud score. For example, the issuing server computer (110) may maintain a risk profile in which the first entity's transacting habits are stored to enable the issuing server computer to detect suspicious transactions or transactions uncharacteristic of the first entity and to notify the first entity accordingly. In some instances, where a fraudulent transaction is detected, the issuing server computer may cancel the transaction and notify the first entity, second entity and/or acquiring server computer accordingly.

The payment processing network (130) may include a transaction request message receiving component (216) for receiving the transaction request message from the issuing server computer (110).

The payment processing network (130) may further include a parsing and identifying component (218) for parsing the transaction request message and identifying the acquiring server computer (120), associated with a second entity, using information contained in the second entity identifier, such as a BIN. For example, in some embodiments, the second entity identifier may include a BIN and an account number of the second entity, in which case the parsing and identifying component (218) may extract the BIN from the second entity identifier and use it to route the transaction request message to the appropriate institution (in this case being the acquiring server computer).

The payment processing network (130) may also include a transaction request message forwarding component (220) for forwarding the transaction request message to the acquiring server computer (120). The transaction request message may be transmitted via a secure financial system transaction message.

Additionally, the payment processing network (130) may include a transaction response message receiving component (222) for receiving a transaction response message from the acquiring server computer (120).

The parsing and identifying component (218) may also parse the received transaction response message and identify the issuing server computer (110) to which the transaction response message is to be transmitted.

A transaction response message forwarding component (224) of the payment processing network (130) may be provided for forwarding the transaction response message to the issuing server computer (110). The transaction response message may be transmitted via a secure financial system transaction message.

The acquiring server computer (120) may include a transaction request message receiving component (226) for receiving the transaction request message from the payment processing network (130).

The acquiring server computer (120) may also include an identifying component (228) which identifies, using the second entity identifier, a financial account of the second entity associated with the transfer of funds. For example, the second entity identifier may include an account number representing the financial account of the second entity which the acquiring server computer can use to identify the appropriate financial account.

The acquiring server computer (120) may further include a crediting component (230) for crediting the financial account (128) associated with the second entity.

A generating component (232) of the acquiring server computer (120) may be provided for generating a transaction response message, which confirms or denies the transaction. When generating the transaction response message, the acquiring server computer (120) may include a second set of data elements including at least one of: identifying data, location data and entity-type data relating to the second entity in the transaction response message.

The transaction response message may also include various pieces of information such as at least one of: the approved transaction amount, an indication that the transaction was approved or not approved, an indication that the transaction was partially approved, and the first and second entity identifiers. The transaction response message may be in the standard ISO 8583 messaging format, or in any other suitable financial system transaction messaging format. The transaction response message may be an 0210 message.

The acquiring server computer (120) may include a transaction response message transmitting component (234) for transmitting the transaction response message including the second set of data elements to the payment processing network (130).

In some embodiments the payment processing network may identify a first set of data elements associated with the transaction request message and process the financial transaction using information contained in the first set of data elements and second set of data elements.

Thus, embodiments anticipate the payment processing network including an identifying component for identifying the first set of data elements associated with the transaction request message. The identifying component may, for example, include a storing component for storing the transaction response message, or a derivative thereof (including the first set of data elements) in a database maintained by the payment processing network in association with the second entity identifier. The identifying component may then, in response to receiving the transaction response message, query the database maintained by the payment processing network using the second entity identifier so as to identify the first set of data elements.

The payment processing network may further include a processing component for processing the financial transaction using information contained in the first set of data elements and second set of data elements. The processing performed by the payment processing network may include calculating interchange in respect of the transfer of funds from the first entity to the second entity. Processing the financial transaction may also include calculating business intelligence in respect of the transfer of funds, evaluating a fraud risk or the like.

Figure 3:
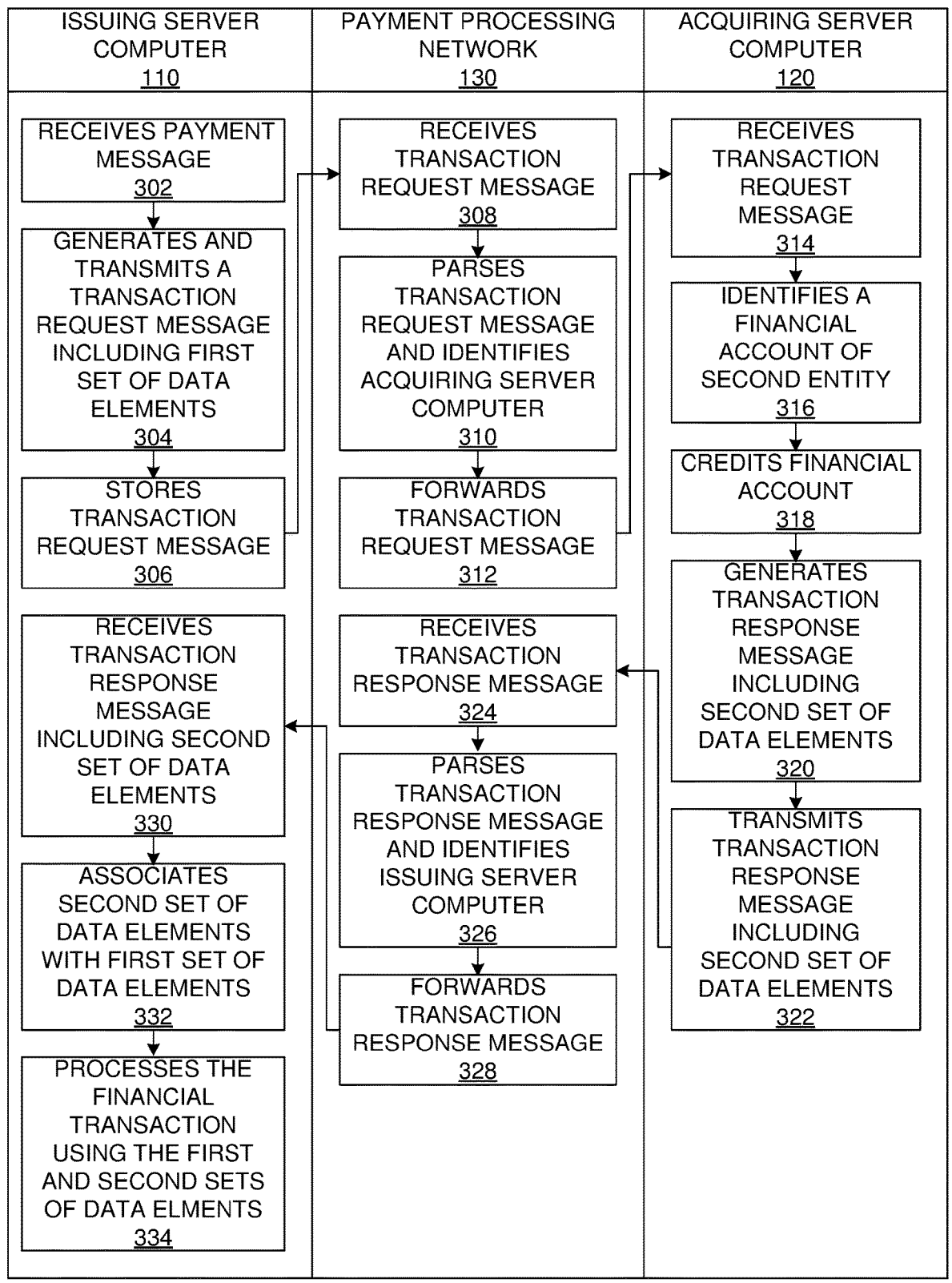
FIG. 3 is a swim-lane flow diagram which illustrates a method for processing a financial transaction according to an embodiment described with reference to FIG. 2.

FIG. 3 is a swim-lane flow diagram which illustrates a method (300) for processing a financial transaction using the systems and components illustrated in FIGS. 1 and 2.

Initially, the first entity, in this embodiment being a consumer, may wish to initiate a transfer of funds to a second entity being a merchant. The first entity may for example be present in a brick and mortar store of the second entity wishing to pay for goods. The second entity may display its second entity identifier at a check-out point to enable the first entity to initiate a push transfer of funds in favour of the second entity. In other scenarios, the first entity may be shopping online, may be transferring funds to a friend, conducting a cash-out at a mobile money agent or the like.

Upon reaching the check-out point, the first entity may use his or her first entity device, being a mobile phone in this embodiment, to establish a communication link with the issuing server computer (110). In this exemplary scenario, the first entity may be operating a simple feature phone having limited functionality (e.g. lacking a camera, data connectivity, processing power, etc.) and may initiate communications with the issuing server computer (110) by establishing a USSD session. For example, the first entity may dial *123# to establish a USSD communication session with the issuing server computer (110). The issuing server computer (110) may respond with an authentication request requesting that the first entity authenticate him- or herself (e.g. by entering a first entity identifier and a PIN). In other cases SMS communications or data messages may be utilised.

Once authenticated, the first entity may be able to request, via the USSD session, a transfer of funds in favour of the second entity and may be required to key in the second entity identifier displayed by the second entity as well as an amount associated with the transfer of funds. The first entity device may transmit one or more payment messages to the issuing server computer (110) which includes a first entity identifier, the second entity identifier which the first entity manually keyed in on the first entity device, and an amount associated with the funds to be transferred.

The transfer of funds in favour of the second entity requested by the first entity is a push transfer or push transaction in that the first entity initiates the transfer from the first entity financial account to a financial account of the second entity which is identified by the second entity identifier. The first entity does not have to provide the second entity with any sensitive information as may be the case in a so-called 'pull transaction'.

At a first stage (302), the issuing server computer (110) receives the one or more payment messages from the first entity device and at a next stage (304) generates and transmits a transaction request message to the payment processing network (130). The issuing server computer (110) may also debit a financial account of the first entity for the amount associated with the transfer of funds.

The transaction request message may include a first set of data elements including: a transaction type indicator indicating, for example, that the transaction is a face-to-face payment transaction for the purchases of goods and services from a merchant; the amount associated with the transfer of funds (e.g., $250); the first entity identifier; and the second entity identifier. The first set of data elements may have been generated by the issuing server computer (110) or may be received in the payment message from the first entity device.

The transaction request message may be properly formatted and transmitted as a secure financial system transaction message. In some embodiments, the transaction may be forwarded as SMS OC or Base 1 OC. The transaction request message formatted as an ISO 8583 (e.g. 0200) type financial transaction message.

The issuing server computer (110) may then, in a following stage (306), create a transaction record in a database and store the transaction request message, or some derivative or record of it (including the first set of data elements), in the database in association with the transaction record.

The transaction request message may then be received at the payment processing network (130) in a next step (308). In a following step (310), the payment processing network (130) may parse the transaction request message and identify an acquiring server computer (120) associated with the second entity (122) (e.g., the merchant) using information contained in the second entity identifier, such as the BIN. In a following step (312), the payment processing network (130) may forward the transaction request message to the acquiring server computer (120). The transaction request message may be transmitted via a secure financial system transaction message.

The acquiring server computer (120) may then receive the transaction request message in a next step (314) and, in a following step (316), identifies a financial account of the second entity associated with the transfer of funds using the second entity identifier.

In a next step (318), the acquiring server computer (120) credits the financial account associated with the second entity and, in a following step (320), generates a transaction response message, which confirms or denies the transaction.

When generating the transaction response message, the acquiring server computer (120) includes a second set of data elements including at least one of: identifying data, location data and entity-type data relating to the second entity in the message. The transaction response message may also include various pieces of information such as at least one of the approved transaction amount, an indication that the transaction was approved or not approved, an indication that the transaction was partially approved, a transaction identifier and the first and second entity identifiers. The transaction response message, including the second set of data elements, may be transmitted to the payment processing network (130) in a next step (322).

The payment processing network (130) may then receive the transaction response message, including the second set of data elements, from the acquiring server computer (120) in a following step (324). The payment processing network (130) may parse the transaction response message and identify the issuing server computer (110) in a following step (326). In a next step (328), the payment processing network (130) forwards the transaction response message to the issuing server computer (110).

The issuing server computer (110) then receives the transaction response message including the second set of data elements from the payment processing network in a following step (330).

In a next step (332), the issuing server computer (110) may then associate the second set of data elements with the first set of data elements. This may include extracting the second entity identifier from the transaction response message and querying the database using the extracted second entity identifier to identify the transaction record having the first set of data elements associated therewith. The issuing server computer (110) may then process the financial transaction using information contained in the first set of data elements and the second set of data elements in a following step (334).

Processing the financial transaction may include calculating interchange in respect of the transfer of funds from the first entity to the second entity; performing settlement and clearing; calculating business intelligence in respect of the transfer of funds; evaluating fraud risk; updating a consumer profile or the like.

Messages may then be sent to the first entity device and second entity device, from their respective financial institutions, indicating the confirmation/denial of the transaction, following which, goods or services may be delivered by the second entity (e.g. the merchant) to the first entity (e.g. the consumer). To complete the transaction, an interchange, and clearing and settlement may be performed. This can be done at the end of the day or at any other suitable time period in order to transfer the appropriate funds from the first entity account to the second entity's account.

In some embodiments, the steps (332, 334) of associating the second set of data elements with the first set of data elements and processing the financial transaction using information contained in the first set of data elements and second set of data elements may be conducted by the payment processing network and not the issuing server computer.

For example, after parsing the transaction request message and determining an acquiring server computer associated with the second entity, the payment processing network may store the transaction request message, or some derivative or record of it (including the first set of data elements), in a database at the payment processing network in association with the second entity identifier.

At a later point after the transaction request message has been transmitted to the acquiring server computer, and following the steps (324, 326) of receiving and parsing the transaction response message, the payment processing network may identify the first set of data elements associated with the transaction request message and, in a following step, process the financial transaction using information contained in the first set of data elements and second set of data elements.

As such, interchange, clearing and settlement may be performed by the payment processing network and may be done at the end of the day or at any other suitable time period in order to transfer the appropriate funds from the first entity account to the second entity's account.

Figure 4:
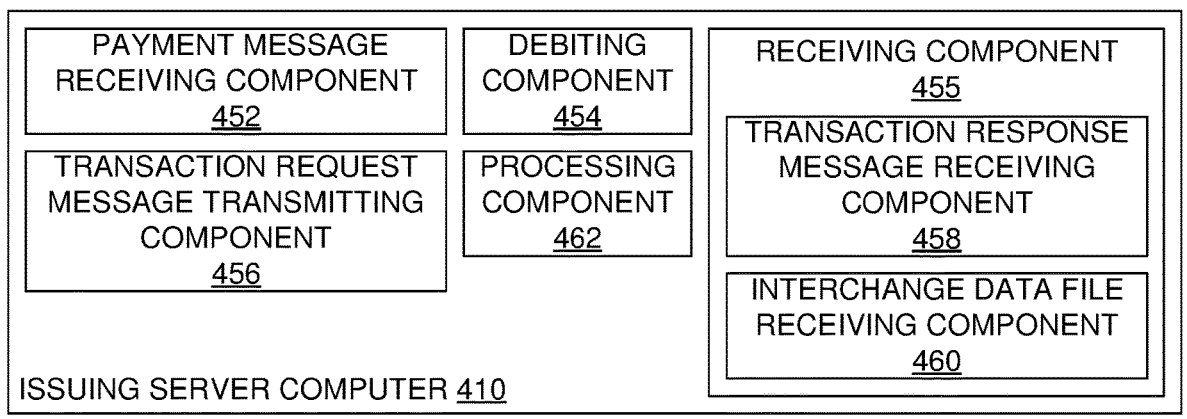
FIG. 4 is a block diagram which illustrates components of another embodiment of an exemplary system for processing a financial transaction.
Figure 4:
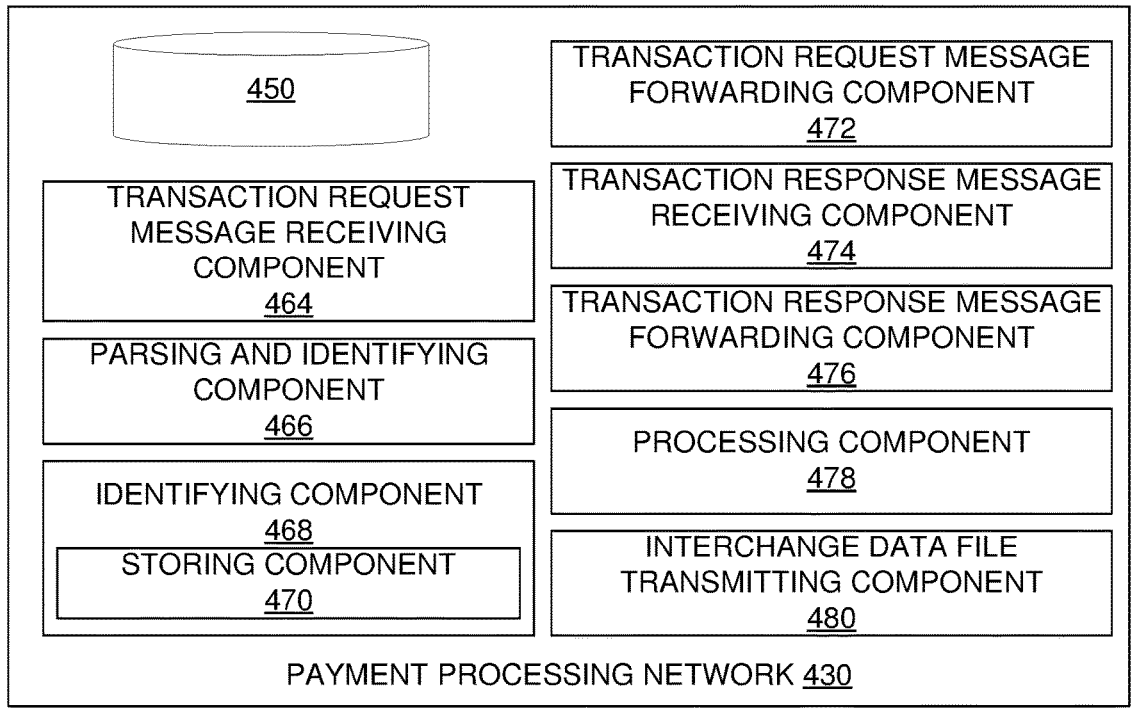
Figure 4:
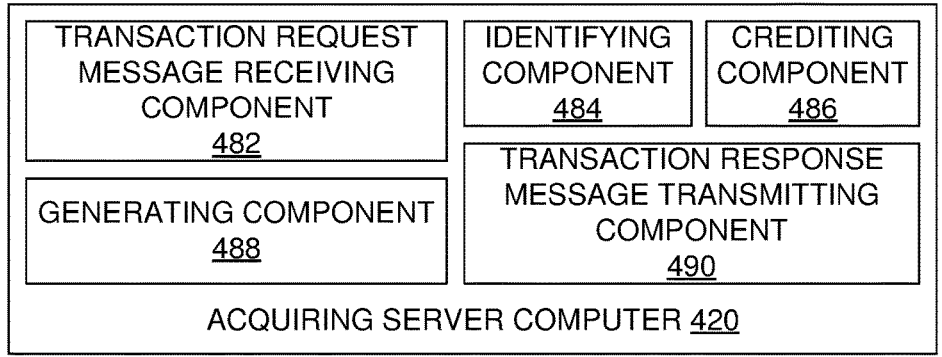

FIG. 4 is a block diagram which illustrates components of another embodiment of an exemplary system (400) for processing a financial transaction. The system (400) includes an issuing server computer (410), an acquiring server computer (420) and a payment processing network (430). In the embodiment illustrated in FIG. 4, the payment processing network (430) includes functionality to identify a second set of data elements by querying a database in which the second set of data elements are stored in association with a second entity identifier.

The issuing server computer (410) may include a payment message receiving component (452) for receiving, from a first entity device, a payment message relating to the transfer of funds from a first entity to a second entity. The transfer of funds is a push transfer which is initiated at the issuing server computer in response to receiving the payment message from the first entity device. The payment message may include a first entity identifier, a second entity identifier, and an amount associated with the funds to be transferred.

The issuing server computer (410) may also include a debiting component (454) for debiting a financial account associated with the first entity. In some embodiments, the debiting component (454) may temporarily debit the financial account pending a fraud risk calculation.

The issuing server computer (410) may also include a transaction request message transmitting component (456) which generates and transmits a transaction request message to the payment processing network (430).

The transaction request message may include a first set of data elements including: a transaction type indicator indicating, for example, that the transaction is a face-to-face payment transaction for the purchase of goods and services from a merchant; an amount associated with the transfer of funds; a first entity identifier; and a second entity identifier. The transaction request message may be properly formatted and transmitted as a secure financial system transaction message. In some embodiments, the transaction may be forwarded as SMS OC or Base 1 OC. It may also be formatted as an ISO 8583 (e.g. 0200) type financial transaction message.

The issuing server computer (410) may include a receiving component (455) which includes a transaction response message receiving component (458) for receiving a transaction response message from the payment processing network (430). In this embodiment, the receiving component (455) further includes an interchange data file receiving component (460) for receiving an interchange data file from the payment processing network (430).

The issuing server computer (410) may also include a processing component (462) for processing the financial transaction which may include: performing interchange, clearing and settlement; calculating business intelligence; computing analytics, fraud risk; updating a first entity profile and the like.

The payment processing network (430) may maintain a database (450) in which the second set of data elements may be associated with the second entity identifier.

The payment processing network (430) may also include a transaction request message receiving component (464) for receiving the transaction request message from the issuing server computer (410). The transaction request message received from the issuing server computer (410) includes the first set of data elements.

The payment processing network (430) may further include a parsing and identifying component (466) for parsing the transaction request message and identifying an acquiring server computer (420) associated with a second entity. The parsing and identifying component (466) may identify the acquiring server computer (420) by using information contained in the second entity identifier, such as a BIN.

The payment processing network (430) may also include an identifying component (468) for identifying a second set of data elements associated with the transaction response message. The payment processing network (430) may for example query the database (450) in which the second set of data elements may be associated with the second entity identifier. In some embodiments, the identifying component (468) may also include a storing component (470) for storing the transaction request message, or some derivative or record of it (including the first set of data elements), in the database (450) in association with, for example, the second entity identifier. It is also anticipated that in some embodiments, the identifying component (468) may permit the issuing server computer (410) to identify the second set of data elements, for example, by querying the database (450) in which the second set of data elements may be associated with the second entity identifier.

The payment processing network (430) may also include a transaction request message forwarding component (472) for forwarding the transaction request message to the acquiring server computer (420). The transaction request message may be transmitted via a secure financial system transaction message.

Additionally, the payment processing network (430) may include a transaction response message receiving component (474) for receiving a transaction response message from the acquiring server computer (420).

The parsing and identifying component (466) may also parse the transaction response message and identify the issuing server computer (410) to which the transaction response message is to be transmitted.

A transaction response message forwarding component (476) of the payment processing network (430) may forward the transaction response message to the issuing server computer (410).

The payment processing network (430) may further include a processing component (478) for processing the financial transaction using information contained in the first set of data elements and the second set of data elements including: calculating interchange in respect of the transfer of funds from the first entity to the second entity; calculating a fraud risk or fraud score; calculating business intelligence; updating a first entity profile or the like.

Embodiments also provide for the payment processing network (430) to include an interchange data file transmitting component (480) for generating and transmitting an interchange data file, including the interchange calculated in respect of the transfer of funds, to the issuing server computer (410).

The acquiring server computer (420) may include a transaction request message receiving component (482) for receiving the transaction request message from the payment processing network (430).

The acquiring server computer (420) may also include an identifying component (484) which identifies, using the second entity identifier, a financial account of a second entity associated with the transfer of funds.

The acquiring server computer (420) may further include a crediting component (486) for crediting a financial account associated with the second entity.

A generating component (488) of the acquiring server computer (420) may be provided for generating a transaction response message, which confirms or denies the transaction. The transaction response message may include various pieces of information such as at least one of the approved transaction amount, an indication that the transaction was approved or not approved, an indication that the transaction was partially approved, and the first and second entity identifiers. The transaction response message may be in the standard ISO 8583 messaging format, or in any other suitable financial system transaction messaging format. The transaction response message may be an 0210 message.

The acquiring server computer (420) may include a transaction response message transmitting component (490) for transmitting the transaction response message to the payment processing network (430).

Figure 5:
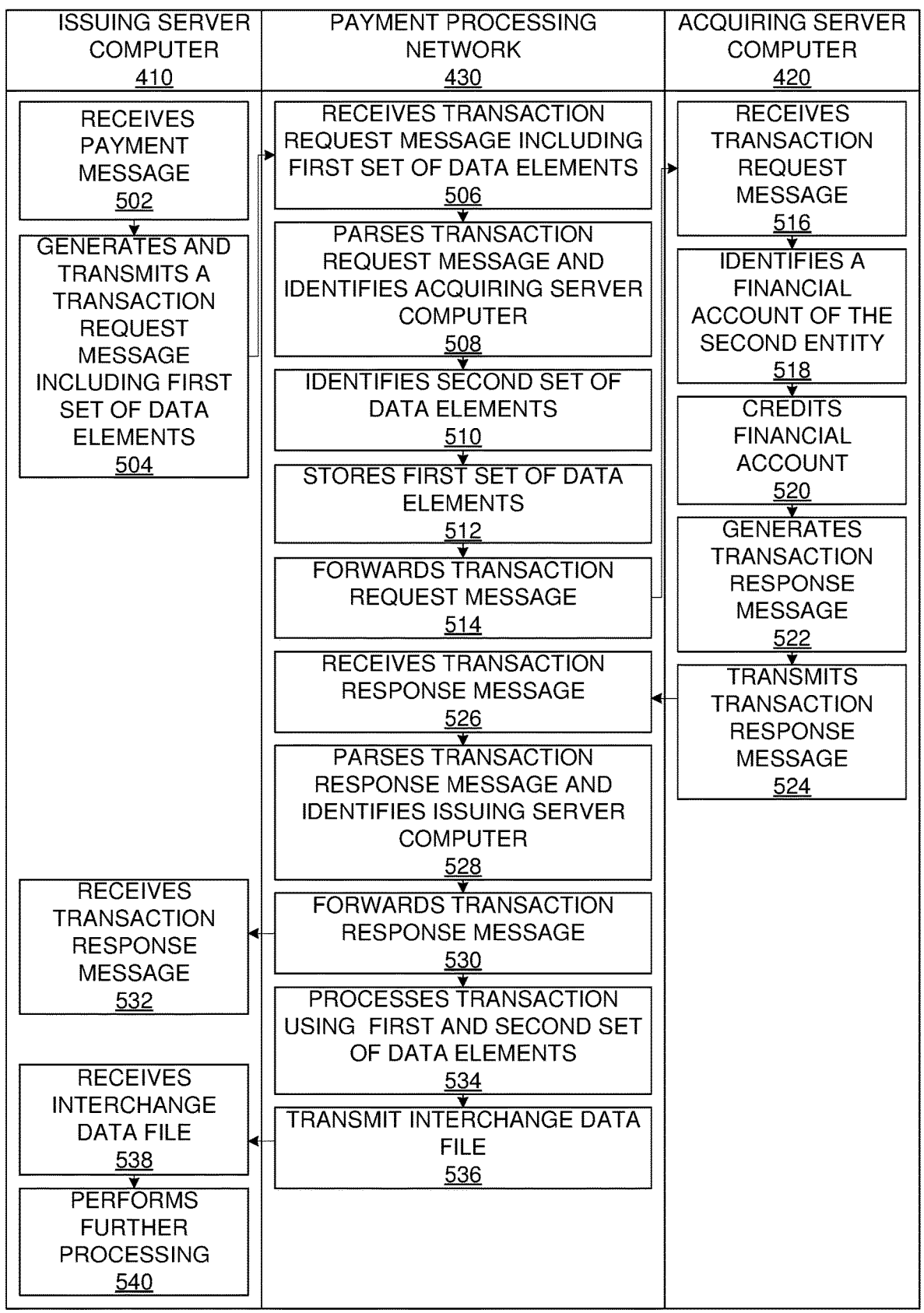
FIG. 5 is a swim-lane flow diagram which illustrates a method for processing a financial transaction according to the embodiment described with reference to FIG. 4.

FIG. 5 is a swim-lane flow diagram which illustrates a method for processing a financial transaction according to the embodiment described above with reference to FIG. 4. As mentioned above, in this embodiment, the payment processing network (430) includes functionality to identify the second set of data elements by querying a database in which the second set of data elements are stored in association with a second entity identifier.

Similar to the exemplary embodiment illustrated in FIG. 3, the first entity may be a consumer and the second entity may be a merchant from whom the first entity wishes to purchase goods and/or services. The first entity may be physically present at the second entity's premises and may wish to purchase the goods and/or services by way of a push transaction in which an amount of currency is pushed from a financial account associated with the first entity, under the direction of the first entity, in favour of a financial account associated with the second entity. The first entity may initiate the transfer of funds by keying a second entity identifier, displayed by the second entity and associated with the second entity's financial account, into his or her first entity device along with an amount associated with the transfer of funds. This information is sent from the first entity device (e.g. a mobile device) together with a first entity identifier associated with the first entity to the issuing server computer (410) via a communication network.

At a first stage (502), the issuing server computer (410) receives the payment message from the first entity device including the first entity identifier, second entity identifier and amount associated with the transfer of funds and, at a next stage (504), generates and transmits a transaction request message to the payment processing network (430). The transaction request message includes a first set of data elements. The issuing server computer (410) may also debit a financial account of the first entity for the amount associated with the transfer of funds.

The transaction request message may then be received at the payment processing network (430) in a next step (506). The payment processing network (430) may then, in a following step (508), parse the transaction request message and identify an acquiring server computer (420) associated with the second entity (e.g., a merchant) using information contained in the second entity identifier, such as the BIN.

The payment processing network (430) may then, in a following step (510), identify a second set of data elements associated with the transaction response message. The payment processing network (430) may for example query a database in which the second set of data elements may be associated with the second entity identifier. In some embodiments, the payment processing network (430) may store the transaction request message, or some derivative or record of it (including the first set of data elements), in the database in association with the second entity identifier in a next step (512).

In a following step (514), the payment processing network (430) forwards the transaction request message to the acquiring server computer (420). The transaction request message may be transmitted via a secure financial system transaction message.

The acquiring server computer (420) then receives the transaction request message in a next step (516) and, in a following step (518), identifies, using the second entity identifier, a financial account of the second entity associated with the transfer of funds.

In a next step (520), the acquiring server computer (420) may credit the financial account associated with the second entity. In a following step (522), the acquiring server computer (420) may generate a transaction response message, which confirms or denies the transaction.

The transaction response message may also include various pieces of information such as at least one of the approved transaction amount, an indication that the transaction was approved or not approved, an indication that the transaction was partially approved, and the first and second entity identifiers. The transaction response message may be a secure financial system transaction message, for example an 0210 message format.

The transaction response message may be transmitted to the payment processing network (430) in a next step (524). The payment processing network (430) may then receive the transaction response message from the acquiring server computer (420) in a following step (526). In a next step (528), the payment processing network (430) may parse the transaction response message and identify the issuing server computer (410).

The payment processing network (430) may then, in a following step (530), forward the transaction response message to the issuing server computer (410) which then receives the transaction response message in a following step (532). In some embodiments, the payment processing network (430) includes the second set of data elements in the transaction response message before forwarding the transaction response message to the issuing server computer (410).

Messages may be sent to the first entity device and second entity device indicating the confirmation/denial of the transaction, following which, goods or services may be delivered by the second entity (e.g. the merchant) to the first entity (e.g. the consumer).

To complete the transaction, an interchange, and clearing and settlement may be performed. This can be done at the end of the day or at any other suitable time period in order to transfer the appropriate funds from the first entity's financial account to the second entity's financial account. Thus, in a next step (534), the payment processing network (430) process the financial transaction using information contained in the first set of data elements which were stored in an earlier step (512) and the second set of data elements. This may include calculating interchange in respect of the transfer of funds from the first entity to the second entity; calculating a fraud risk or fraud score; calculating business intelligence or the like. In some embodiments, the step (534) of processing the financial transaction may be performed before the messages are sent to the first entity device and second entity device.

In a following step (536), the payment processing network (430) may transmit an interchange data file, including the interchange calculated in respect of the transfer of funds and optionally the second set of data elements, to the issuing server computer (410). The issuing server computer (410) may then receive the interchange data file in a following step (538) such that the issuing server computer (410) may, in a next step (540), perform further processing. Performing further processing may complete the transaction by, for example, performing interchange, clearing, settlement; calculating business intelligence, a fraud risk or score; computing analytics; updating a first entity profile, and the like. In some embodiments, for example where the payment processing network (430) includes the second set of data elements in the transaction response message, the issuing server computer (410) may perform further processing prior to interchange being calculated.

It is further anticipated that in other embodiments, the payment processing network may not perform the step of processing the transaction. Rather, and as mentioned briefly above, the payment processing network may include the second set of data elements in the transaction response message before forwarding the transaction response message to the issuing server computer. Thus, the issuing server computer may receive the transaction response message including the second set of data elements, may identify a corresponding first set of data elements stored locally thereat and may then process the financial transaction using information contained in the first set of data elements and second set of data elements.

For example, in cases where location data included in the second set of data elements is a physical location of the second entity, the issuing server computer (410) may query the location data included in the second set of data elements against permitted transaction locations associated with the first entity and, if the location data is within a permitted transaction location, allowing the transfer of funds to proceed. In this manner, the issuing server computer (410) may be able to regulate where the first entity is permitted to transact. For example, the first entity may be limited to transacting only within a particular country, city or the like. Where the first entity attempts to transact outside of a permitted location (e.g. in another country) the issuing server computer may decline the transaction.

It is also anticipated that the database maintained by the payment processing network be accessible by both the issuing server computer and the acquiring server computer. The acquiring server computer may store the second set of data elements in the database in association with the second entity identifier, for example. The issuing server computer may then be able to query the database, for example using the second entity identifier, so as to obtain the second set of data elements and then use the second set of data elements, together with the first set of data elements, process the financial transaction.

Embodiments of the described systems and methods thus permit interchange in respect of a transfer of funds from a first entity operating a first entity device to a second entity, and in particular in respect of the transfer being a push transaction, such as an OCT push transaction. Other business intelligence, fraud risk/scores, analytics and the like may also be calculated by one or both of a payment processing network and an issuing server computer associated with a first entity. In order to achieve this, information about the second entity is provided to one or both of the payment processing network or issuing server computer without the first entity (e.g. a consumer) having to enter this data into his or her first entity device (e.g. mobile phone). This is particularly advantageous in scenarios where the first entity utilises a relatively simple feature phone, having basic functionality, in order to initiate the push transaction. In such cases, the first entity device does not facilitate easy capture of data and thus the data required to be input by the first entity into the device should be kept to a minimum.

As described above, in one particular embodiment, a second set of data elements (including for example, a merchant category code, a merchant name, a city name, a country code, a primary identifier, a secondary identifier, and the like) are included in a transaction response message (e.g. the 0210 message) sent from an acquiring financial institution to an issuing financial institution.

In another particular embodiment, the payment processing network maintains a central database in which second set of data elements (including for example, a merchant category code, a merchant name, a city name, a country code, a primary identifier, a secondary identifier, and the like) is stored in association with a second entity identifier. The second set of data elements may be included in a transaction response message (e.g. the 0210 message) forwarded to an issuing financial institution.

Figure 6:
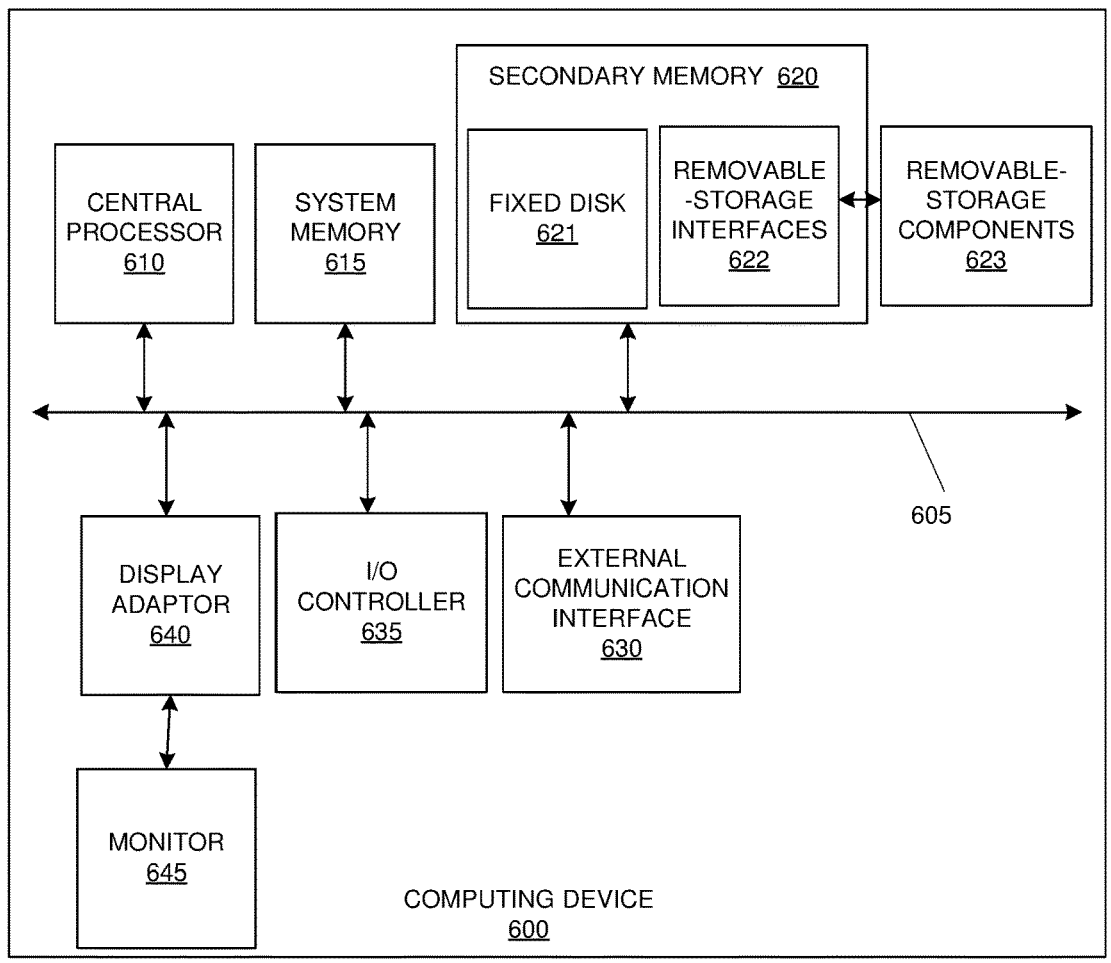
FIG. 6 illustrates an example of a computing device in which various aspects of the disclosure may be implemented; and, FIG. 7 shows a block diagram of a communication device that may be used in embodiments of the disclosure.

FIG. 6 illustrates an example of a computing device (600) in which various aspects of the disclosure may be implemented. The computing device (600) may be suitable for storing and executing computer program code. The various participants and elements in the previously described system diagrams may use any suitable number of subsystems or components of the computing device (600) to facilitate the functions described herein.

The computing device (600) may include subsystems or components interconnected via a communication infrastructure (605) (for example, a communications bus, a cross-over bar device, or a network). The computing device (600) may include at least one central processor (610) and at least one memory component in the form of computer-readable media.

The memory components may include system memory (615), which may include read only memory (ROM) and random access memory (RAM). A basic input/output system (BIOS) may be stored in ROM. System software may be stored in the system memory (615) including operating system software.

The memory components may also include secondary memory (620). The secondary memory (620) may include a fixed disk (621), such as a hard disk drive, and, optionally, one or more removable-storage interfaces (622) for removable-storage components (623).

The removable-storage interfaces (622) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (622) may also be in the form of ports or sockets for interfacing with other forms of removable-storage components (623) such as a flash memory drive, external hard drive, or removable memory chip, etc.

The computing device (600) may include an external communications interface (630) for operation of the computing device (600) in a networked environment enabling transfer of data between multiple computing devices (600). Data transferred via the external communications interface (630) may be in the form of signals, which may be electronic, electromagnetic, optical, radio, or other types of signal.

The external communications interface (630) may enable communication of data between the computing device (600) and other computing devices including servers and external storage facilities. Web services may be accessible by the computing device (600) via the communications interface (630).

The external communications interface (630) may also enable other forms of communication to and from the computing device (600) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (610).

A computer program product may be provided by a non-transient computer-readable medium, or may be provided via a signal or other transient means via the communications interface (630).

Interconnection via the communication infrastructure (605) allows a central processor (610) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (600) either directly or via an I/O controller (635). These components may be connected to the computing device (600) by any number of means known in the art, such as a serial port.

One or more monitors (645) may be coupled via a display or video adapter (640) to the computing device (600).

Figure 7:
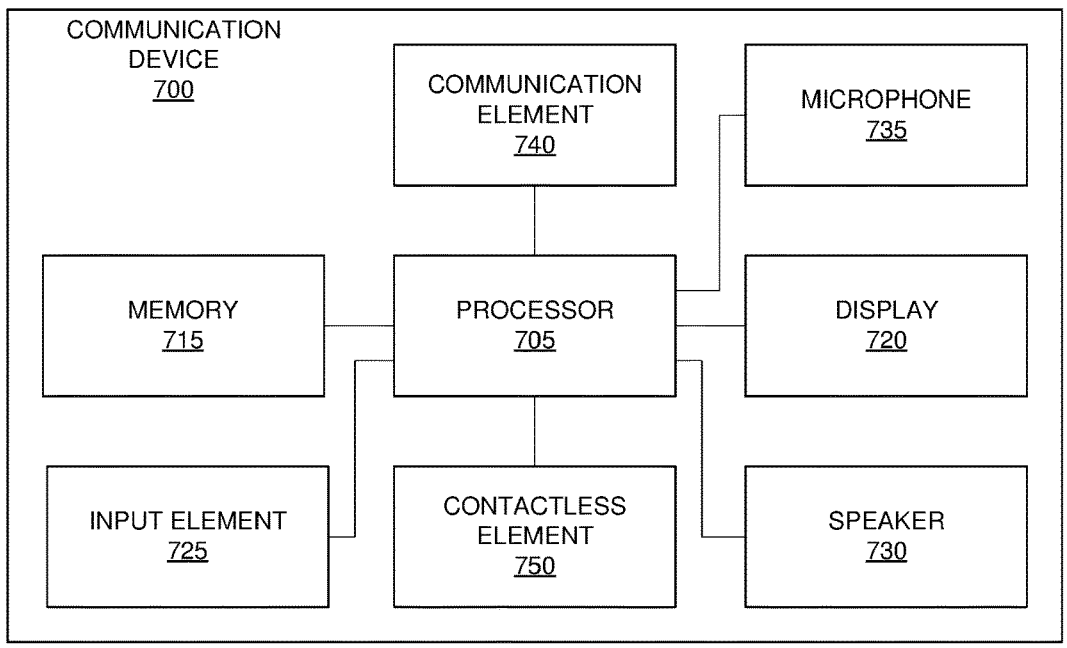

FIG. 7 shows a block diagram of a communication device (700) that may be used in embodiments of the disclosure. The communication device (700) may be a cell phone, a feature phone, a smart phone, a satellite phone, or a computing device having a phone capability.

The communication device (700) may include a processor (705) (e.g., a microprocessor) for processing the functions of the communication device (700) and a display (720) to allow a user to see the phone numbers and other information and messages. The communication device (700) may further include an input element (725) to allow a user to input information into the device (e.g., input buttons, touch screen, etc.), a speaker (730) to allow the user to hear voice communication, music, etc., and a microphone (735) to allow the user to transmit his or her voice through the communication device (700).

The processor (710) of the communication device (700) may connect to a memory (715). The memory (715) may be in the form of a computer-readable medium that stores data and, optionally, computer-executable instructions.

The communication device (700) may also include a communication element (740) for connection to communication channels (e.g., a cellular telephone network, data transmission network, Wi-Fi network, satellite-phone network, Internet network, Satellite Internet Network, etc.). The communication element (740) may include an associated wireless transfer element, such as an antenna.

The communication element (740) may include a subscriber identity module (SIM) in the form of an integrated circuit that stores an international mobile subscriber identity and the related key used to identify and authenticate a subscriber using the communication device (700). One or more subscriber identity modules may be removable from the communication device (700) or embedded in the communication device (700).

The communication device (700) may further include a contactless element (750), which is typically implemented in the form of a semiconductor chip (or other data storage element) with an associated wireless transfer element, such as an antenna. The contactless element (750) may be associated with (e.g., embedded within) the communication device (700) and data or control instructions transmitted via a cellular network may be applied to the contactless element (750) by means of a contactless element interface (not shown). The contactless element interface may function to permit the exchange of data and/or control instructions between mobile device circuitry (and hence the cellular network) and the contactless element (750).

The contactless element (750) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (700) and an interrogation device. Thus, the communication device (700) may be capable of communicating and transferring data and/or control instructions via both a cellular network and near field communications capability.

The data stored in the memory (715) may include: operation data relating to the operation of the communication device (700), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (700) to selected receivers.

The communication device (700) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method for processing a financial transaction conducted at an issuing server computer associated with a first entity, the issuing server computer controlling an account of the first entity, the method comprising:
   receiving, by the issuing server computer, a payment message from a first entity device comprising a contactless element, the first entity device associated with the first entity;
   responsive to receiving the payment message from the first entity device, electronically transmitting, by the issuing server computer, a transaction request message to an acquiring server computer associated with a second entity, the transaction request message being in respect of a push transaction in which funds from the first entity are transferred to the second entity, the acquiring server computer controlling an account of the second entity, wherein the transaction request message includes a first set of data elements including: a first entity identifier, a second entity identifier, and an amount associated with the funds to be transferred;
   responsive to transmitting the transaction request message, creating, by the issuing server computer, a transaction record in a database and storing at least the first set of data elements in the database in association with the transaction record;
   in response to transmitting the transaction request message, receiving, by the issuing server computer, a transaction response message including a second set of data elements including location data comprising a location of the second entity from the acquiring server computer, and wherein the account of the second entity is credited for the amount;
   querying, by the issuing server computer, the database using the second entity identifier to identify the transaction record associated with the first set of data elements;
   associating, by the issuing server computer, the second set of data elements with the first set of data elements;
   processing, by the issuing server computer, the financial transaction using information contained in the first set of data elements and the second set of data elements, wherein processing includes performing a fraud risk analysis on the financial transaction by comparing the location of the second entity to permitted transaction locations associated with the first entity to determine a risk score for the financial transaction; and
   completing, by the issuing server computer, the financial transaction based on at least the fraud risk analysis, wherein completing the financial transaction comprises performing a clearing and settlement process between the issuing server computer and the acquiring server computer based on at least the fraud risk analysis to transfer funds associated with the amount from the issuing server computer to the acquiring server computer, and
   wherein the first entity is a consumer and the second entity is a merchant.

2. The method as claimed in claim 1, wherein the transaction request message is an 0200 message in a standard ISO 8583 messaging format, and wherein the transaction response message is an 0210 message in the standard ISO 8583 messaging format.

3. The method as claimed in claim 1, wherein the transaction response message is received from the acquiring server computer via a payment processing network; and wherein the transaction request message is transmitted to the acquiring server computer via the payment processing network.

4. The method as claimed in claim 1, wherein receiving the second set of data elements includes querying a database maintained by a payment processing network in which the second set of data elements is stored in association with the second entity identifier.

5. The method of claim 1, wherein the first entity device is a feature phone, which the first entity uses to contact the issuing server computer to initiate transmission of the transaction request message.

6. A method for processing a financial transaction conducted at a payment processing network comprising:
   electronically receiving, by the payment processing network, a transaction request message from an issuing server computer associated with a first entity to an acquiring server computer, the issuing server computer controlling an account of the first entity, the transaction request message being in respect of a push transaction in which funds from the first entity are transferred to a second entity, the acquiring server computer controlling an account of the second entity, wherein the transaction request message is received from the issuing server computer in response to the issuing server computer receiving a payment request message from a first entity device comprising a contactless element, and wherein the transaction request message includes a first set of data elements including: a first entity identifier, a second entity identifier, and an amount associated with the funds to be transferred, wherein the issuing server computer creates a transaction record in a database and stores at least the first set of data elements in the database in associated with the transaction record, and wherein the account of the second entity is credited for the amount;

identifying, by the payment processing network, a second set of data elements associated with the transfer of funds, the second set of data elements including location data comprising a location of the second entity from the acquiring server computer; and, processing, by the payment processing network, the financial transaction using information contained in the first set of data elements and the second set of data elements, wherein processing includes performing a fraud risk analysis on the financial transaction by comparing the location of the second entity to permitted transaction locations associated with the first entity to determine a risk score for the financial transaction; and completing, by the payment processing network, the financial transaction based on at least the fraud risk analysis, wherein completing the financial transaction comprises performing a clearing and settlement process between the issuing server computer and the acquiring server computer based on at least the fraud risk analysis to transfer funds associated with the amount from the issuing server computer to the acquiring server computer, and wherein the first entity is a consumer and the second entity is a merchant.

7. The method as claimed in claim 6, wherein the method includes:
forwarding the transaction request message to the acquiring server computer associated with the second entity;
receiving, from the acquiring server computer, a transaction response message; and,
forwarding the transaction response message to the issuing server computer.

8. The method as claimed in claim 7, wherein the transaction response message includes the second set of data elements and wherein identifying the second set of data elements includes extracting the second set of data elements from the transaction response message.

9. The method as claimed in claim 6, wherein the payment processing network maintains another database in which the second set of data elements are stored, and wherein identifying the second set of data elements includes obtaining the second set of data elements from the another database.

10. The method as claimed in claim 6, wherein the method includes:
storing the transaction request message or a derivative thereof in a database in association with the second entity identifier.

11. The method as claimed in claim 6, wherein the method includes:
transmitting an interchange data file, including interchange calculated using the first set of data elements and the second set of data elements in respect of the transfer of funds and optionally the second set of data elements, to the issuing server computer.

12. The method of claim 6, wherein the first entity device is a feature phone, which the first entity uses to contact the issuing server computer to initiate transmission of the transaction request message.

13. A system for processing a financial transaction including an issuing server computer associated with a first entity, the issuing server computer controlling an account of the first entity, comprising:
a non-transitory computer-readable medium having stored computer readable program code, the computer readable program code executable by a processing circuit for executing a method that comprises:
receiving, by the issuing server computer, a payment message from a first entity device comprising a contactless element, the first entity device associated with the first entity;
responsive to receiving the payment message from the first entity device, electronically transmitting, by the issuing server computer, a transaction request message to an acquiring server computer associated with a second entity, the acquiring server computer controlling an account of the second entity, the transaction request message being in respect of a push transaction in which funds from the first entity are transferred to the second entity, wherein the transaction request message includes a first set of data elements including: a first entity identifier, a second entity identifier, and an amount associated with the funds to be transferred, and wherein the account of the second entity is credited for the amount;
responsive to transmitting the transaction request message, creating, by the issuing server computer, a transaction record in a database and storing at least the first set of data elements in the database in association with the transaction record;
in response to transmitting the transaction request message, receiving, by the issuing server computer, a transaction response message including a second set of data elements including location data comprising a location of the second entity from the acquiring server computer;
querying, by the issuing server computer, the database using the second entity identifier to identify the transaction record associated with the first set of data elements;
associating, by the issuing server computer, the second set of data elements with the first set of data elements; and,
processing, by the issuing server computer, the financial transaction using information contained in the first set of data elements and the second set of data elements, wherein processing includes performing a fraud risk analysis on the financial transaction by comparing the location of the second entity to permitted transaction locations associated with the first entity to determine a risk score for the financial transaction; and
completing, by the issuing server computer, the financial transaction based on at least the fraud risk analysis, wherein completing the financial transaction comprises performing a clearing and settlement process between the issuing server computer and the acquiring server computer based on at least the fraud risk analysis to transfer funds associated with the amount from the issuing server computer to the acquiring server computer, and wherein the first entity is a consumer and the second entity is a merchant.

14. The system as claimed in claim 13, wherein the issuing server computer receives the transaction response message from a payment processing network; and wherein the issuing server computer transmits the transaction request message to the acquiring server computer via the payment processing network.

15. The system as claimed in claim 13, wherein the issuing server computer includes an interchange data file receiving component for receiving an interchange data file including the second set of data elements from a payment processing network.

16. The system as claimed in claim 13, wherein the issuing server computer includes a database querying component for querying a database maintained by a payment processing network in which the second set of data elements is stored in association with the second entity identifier.

17. A system for processing a financial transaction including a payment processing network comprising:

a non-transitory computer-readable medium having stored computer readable program code, the computer readable program code executable by a processing circuit for executing a method that comprises:

electronically receiving, by the payment processing network, a transaction request message from an issuing server computer associated with a first entity to an acquiring server computer, the issuing server computer controlling an account of the first entity, the transaction request message being in respect of a push transaction in which funds from the first entity are transferred to a second entity, the acquiring server computer controlling an account of the second entity, wherein the transaction request message is received from the issuing server computer in response to the issuing server computer receiving a payment request message from a first entity device comprising a contactless element, and wherein the transaction request message includes a first set of data elements including: a first entity identifier, a second entity identifier, and an amount associated with the funds to be transferred, wherein the issuing server computer creates a transaction record in a database and stores at least the first set of data elements in the database in associated with the transaction record, and wherein the account of the second entity is credited for the amount;

identifying, by the payment processing network, a second set of data elements associated with the transfer of funds, the second set of data elements including location data comprising a location of the second entity from the acquiring server computer; and, processing, by the payment processing network, the financial transaction using information contained in the first set of data elements and the second set of data elements, wherein processing includes performing a fraud risk analysis on the financial transaction by comparing the location of the second entity to permitted transaction locations associated with the first entity to determine a risk score for the financial transaction; and completing, by the payment processing network, the financial transaction based on at least the fraud risk analysis, wherein completing the financial transaction comprises performing a clearing and settlement process between the issuing server computer and the acquiring server computer based on at least the fraud risk analysis to transfer funds associated with the amount from the issuing server computer to the acquiring server computer, wherein the first entity is a mobile device operated by a consumer and the second entity is a merchant.

18. The system as claimed in claim 17, wherein the method comprises receiving a transaction response message including the second set of data elements and wherein the payment processing network extracts the second set of data elements included in the transaction response message.

19. The system as claimed in claim 17, wherein the payment processing network includes a storing component for storing the transaction request message or a derivative thereof in a database in association with the second entity identifier.

* * * * *